United States Patent [19]
Fletcher

[11] 3,869,932
[45] Mar. 11, 1975

[54] SPRING BIASED DOUBLE ACTING EXPANSIBLE PULLEY WITH INCREASED SPRING FATIGUE LIFE

[75] Inventor: Peter C. Fletcher, Chagrin Falls, Ohio

[73] Assignee: Speed Selector, Inc., Chagrin Falls, Ohio

[22] Filed: May 23, 1973

[21] Appl. No.: 362,904

[52] U.S. Cl. ................ 74/230.17 R, 74/230.17 A, 74/230.17 C
[51] Int. Cl. .......................................... F16h 55/52
[58] Field of Search ............ 74/230.17 A, 230.17 R, 74/230.17 M, 230.17 B, 230.17 C

[56] References Cited

UNITED STATES PATENTS

| | | | |
|---|---|---|---|
| 1,416,745 | 5/1922 | Peters | 74/230.17 B |
| 2,050,358 | 8/1936 | McElroy et al. | 74/230.17 M |
| 2,924,108 | 2/1960 | Maroldt | 74/230.17 C |
| 2,973,655 | 3/1961 | Rix | 74/230.17 C |
| 3,060,759 | 10/1962 | Van Der Brugghen | 74/230.17 C |
| 3,727,476 | 4/1973 | Heidorn | 74/230.17 C |
| 3,786,688 | 1/1974 | Svenson | 74/330.17 M |

*Primary Examiner*—Samuel Scott
*Assistant Examiner*—Allan R. Burke

[57] ABSTRACT

A variable drive pulley includes first and second pulley parts, at least one of which is shiftable toward and away from the other. A leaf spring assembly normally biases the one pulley part toward the other pulley part. The leaf springs have flat mounting end portions secured between a flat circular inner plate and a larger outer plate. The leaf springs extend parallel to the facing surfaces of the plates and then just beyond the outer edge of the smaller plate smoothly diverge away from the larger outer plate with a curved tangent to the surface thereof. During flexure of the springs, the curved portions roll along the inner surface of the outer plate so that flexure occurs over a length of spring as opposed to at a precise point or edge.

8 Claims, 5 Drawing Figures

106
G
102
76
90
108
74
82
112
114
H
92

102
76
74
H
H
H 102
76
74
132
130
H

SPRING BIASED DOUBLE ACTING EXPANSIBLE PULLEY WITH INCREASED SPRING FATIGUE LIFE

BACKGROUND OF THE INVENTION

This application pertains to the art of pulleys and, more particularly, to variable drive pulleys. The invention is particularly applicable to double acting variable drive pulleys and will be described with particular reference thereto. However, it will be appreciated that the invention has broader applications and may be used in other types of devices.

Double acting variable drive pulleys of a known type include first and second pulley parts mounted on a hub for rotation therewith about a longitudinal axis. The first and second pulley parts are shiftable toward and away from one another along the hub for varying the drive ratio of a V-belt positioned between the pulley parts. Leaf spring assemblies are mounted on the hub outwardly of the pulley parts and have leaf springs engaging the outer surfaces of the pulley parts for normally biasing them toward one another.

Double acting pulleys of the type described are disclosed in such prior patents as McElroy U.S. Pat. No. 2,050,358 and Maroldt U.S. Pat. No. 2,924,108. In the arrangement shown in the Maroldt patent, the leaf springs are sharply bent at a precise point adjacent a mounting plate. During movement of the pulley parts toward and away from one another, flexure of the leaf springs occurs at this precise and sharp bending point. In the arrangement disclosed in the Maroldt patent, mounting portions of the leaf springs are gripped between the inner and outer flat circular plates having the same outer diameter. Flexure of the leaf springs in Maroldt occurs at a precise point defined by the edges of the mounting plates.

The leaf springs are in a constant state of deflection, not only the occasional high amplitude deflection when there is a speed change, but the high frequency, low amplitude deflections due to irregularities in the pulley or belt surfaces. In the prior art arrangements, the leaf springs are cantilevered and bend along a fixed point or line. Deflection always takes place in this precise bending area. Fatigue failures are a constant problem.

SUMMARY OF INVENTION

The present invention contemplates a leaf spring mounting arrangement which distributes the flexing of the spring over a length thereof so that fatigue failures are reduced or eliminated.

In accordance with the broadest aspect of the invention each leaf spring is mounted inwardly of the outer edge of a supporting member and the spring and member are so shaped that the portion of the spring which will flex during operation gradually diverges from the member in a smooth curve tangent with a abutting surface of the member. This diverging may be obtained by curving the spring, the supporting member, or both. Tangency and a large, although not constant radius, are necessary.

In accordance with a preferred arrangement, a pair of larger and smaller plate members are provided having coincidental centers and the leaf springs are clamped between these plates and extend radially outwardly from between the plates. The larger plate extends radially outwardly beyond the smaller plate and the leaf spring in the unstressed condition diverges in a smooth tangent curve away from the surface of this larger plate beyond the outer edge of the smaller plate. Forces on the spring toward the larger plate cause the spring to bend so that progressively, radially outer portions of the spring engage the larger plate. Flexing occurs over a substantial length of the spring rather that at a single point or line as before. Further in accordance with the invention, the edges of the inner ends of the springs are cut on radial lines and the edges of adjacent springs generally abut so that the springs are generally always held on radial lines without the need for other alignment means.

BRIEF DESCRIPTION OF THE DRAWING

The invention may take form in certain parts and arrangement of parts, a preferred embodiment of which will be described in detail in this specification and illustrated in the accompanying drawing which forms a part hereof.

DESCRIPTION OF A PREFERRED EMBODIMENT

Figure 1:
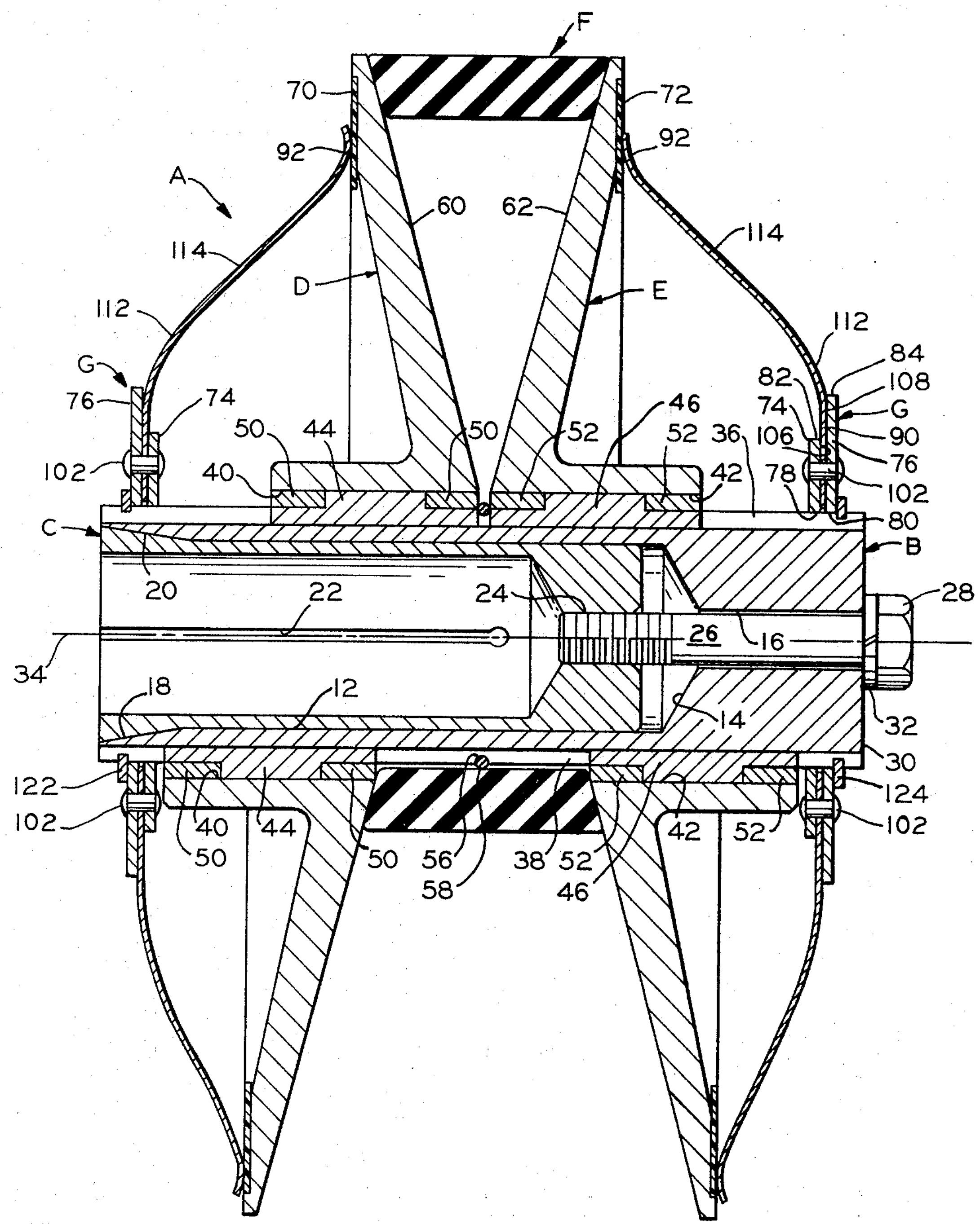
FIG. 1 is a cross-sectional elevational view showing a double acting pulley having the improvement of the present invention incorporated therein.

Referring now to the drawing, wherein the showings are for the purposes of illustrating the preferred embodiment of the invention only and not for purposes of limiting same, FIG. 1 shows a double acting pulley A having the improvement of the present invention incorporated therein.

Pulley A includes an elongated generally cylindrical hub B having a cylindrical bore 12 therein which tapers as at 14 to intersect a much smaller diameter cylindrical hole 16. The open end portion of bore 12 is tapered as at 18 for cooperation with tapered surfaces as at 20 on a split sleeve member C. Split sleeve member C has longitudinally extending circumferentially spaced slits as at 22 for providing a plurality of elongated resilient fingers which grip a shaft. Split sleeve member C has a threaded hole as at 24 threadably receiving a bolt 26 which extends through hole 16 and has an enlarged head 28 bearing against end surface 30 of hub B through a washer 32. Rotation of bolt 26 moves split sleeve member C so that cooperating tapered surfaces 18 and 20 cause the resilient fingers to grip a shaft on which pulley A is to be mounted. This also fixes hub B to split sleeve member C against relative rotation. Pulley A rotates about longitudinal axis 34.

The outer surface of hub B is provided with longitudinal keyways 36 and 38 extending the full length thereof parallel to longitudinal axis 34.

First and second pulley parts D and E are mounted on hub B for rotation therewith. Pulley parts D and E have circular holes centrally located therethrough for fitting over hub B. The circular central openings through pulley parts D and E are interrupted by longitudinally extending keyways as at 40 and 42. Keyways 40 and 42 receive elongated keys 44 and 46 which are slidably received in keyways 36 and 38. Keys 44 and 46 are secured in position on pulley parts D and E by press fit shims as at 50 and 52 received in suitable notches in the opposite end portions of keys 44 and 46. Hub B may have a centrally located circumferential groove as at 56 therein for receiving an O-ring 58 for preventing contact between pulley parts D and E.

Pulley parts D and E have facing inner surfaces 60 and 62 which lie on surfaces of cones and diverge in a direction outwardly from longitudinal axis 34. The outer surfaces of pulley parts D and E have flat circular wear plates 70 and 72, preferably of a wear resistant low coefficient of friction material such as Nylon.

Hub B is normally mounted on the shaft of an electric driving motor (not shown) which in turn is mounted on a sliding motor base (not shown). A conventional V-belt F is received between inner surfaces 60 and 62 and drives a fixed or non-variable pitch pulley mounted on a fixed shaft. Adjustment of the position of the motor base moves belt F radially inwardly or outwardly between the maximum outward position shown at the top of FIG. 1 and the maximum inward position shown at the bottom half of FIG. 1. To permit this, pulley parts D and E shift away from and toward one another against and with the bias of spring assemblies G.

Spring assemblies G are mounted on hub B outwardly of pulley parts D and E and bias pulley parts D and E toward one another. Each spring assembly G includes circular inner and outer plate members 74 and 76. Plate members 74 and 76 have circular holes 78 and 80 of the same size centrally therethrough for reception over cylindrical hub B.

Outer plate 76 has a substantially larger outer diameter than inner plate 74 so that circular outer peripheral edges 82 and 84 are spaced-apart from one another substantially radially of longitudinal axis 34.

A plurality of generally flat leaf springs H have mounting end portions as at 90 and free end portions as at 92. Free end portions 92 are smoothly curved for providing a generally smooth surface bearing against plates 70 and 72.

Each of the plates 74 and 76 has a center substantially coincidental with longitudinal axis 34. Each leaf spring H has a longitudinal axis 96 extending substantially radially from such centers and from longitudinal axis 34. Plates 74 and 76, and mounting portions 90 of leaf springs H, have suitable circular holes therethrough for receiving rivets as at 102 which tightly clamp plates 74 and 76 together with mounting portion 90 gripped therebetween.

Plates 74 and 76 have opposed facing flat inner surfaces 106 and 108. Mounting portion 90 of spring H extends parallel to inner surfaces 106 and 108 in contact therewith over a predetermined distance from outer edge 82 of inner plate member 74 toward outer edge 84 of plate member 76. Mounting portion 90 then gradually diverges in a smoothly curved portion generally indicated by numeral 112 across inner plate 74 outwardly thereof and away from tangency with the inner surface 108 of outer plate member 76. Curved portion 112 curves away from inner surface 108 of plate member 76 in a location intermediate outer edges 82 and 84. That is, curved portion 112 curves away from inner surface 108 of plate member 76 short of outer edge 84. In a preferred arrangement, curved portion 112 is smoothly curved on a radius of at least one-half inch and preferably at least one and one half inches. Curved portion 112 then merges into a straight portion 114 which in turn merges into reversely curved free end portion 92. In the arrangement shown and described, outer edge 82 of inner plate member 74 is spaced a greater distance from free end portion 92 than outer edge 84 of plate member 76. Alternatively, the portion 76 could be curved upwardly.

The arrangement described wherein curved portion 112 curves away from inner surface 108 of plate member 76 ahead of outer edge 84 is the condition existing when pulley parts D and E are closest together as in the upper half of FIG. 1. When pulley parts D and E move apart up to the position shown at the bottom half of FIG. 1, curved portion 112 generally rolls along inner surface 108 of outer plate member 76 so that curved portion 112 may actually contact the entire inner surface of outer plate member 76. However, it will be recognized that it is possible to make outer plate member 76 of a larger diameter if so desired. The important feature is that curved portion 112 flexes over a certain length thereof in a rolling action against inner surface 108 of outer plate members 76. The point of flexure does not occur at a precise point all the time. At least in the intermediate range of movement of pulley parts D and E toward and away from one another, spring H will not contact the entire inner surface 108 of outer place member 76 to reach a condition where spring H would be flexing against edge 84 of outer plate member 76. Hub B has circumferential grooves therein receiving C-rings as at 122 and 124 for retaining spring assembly G thereon.

Figures 2, 3, 4, 5:
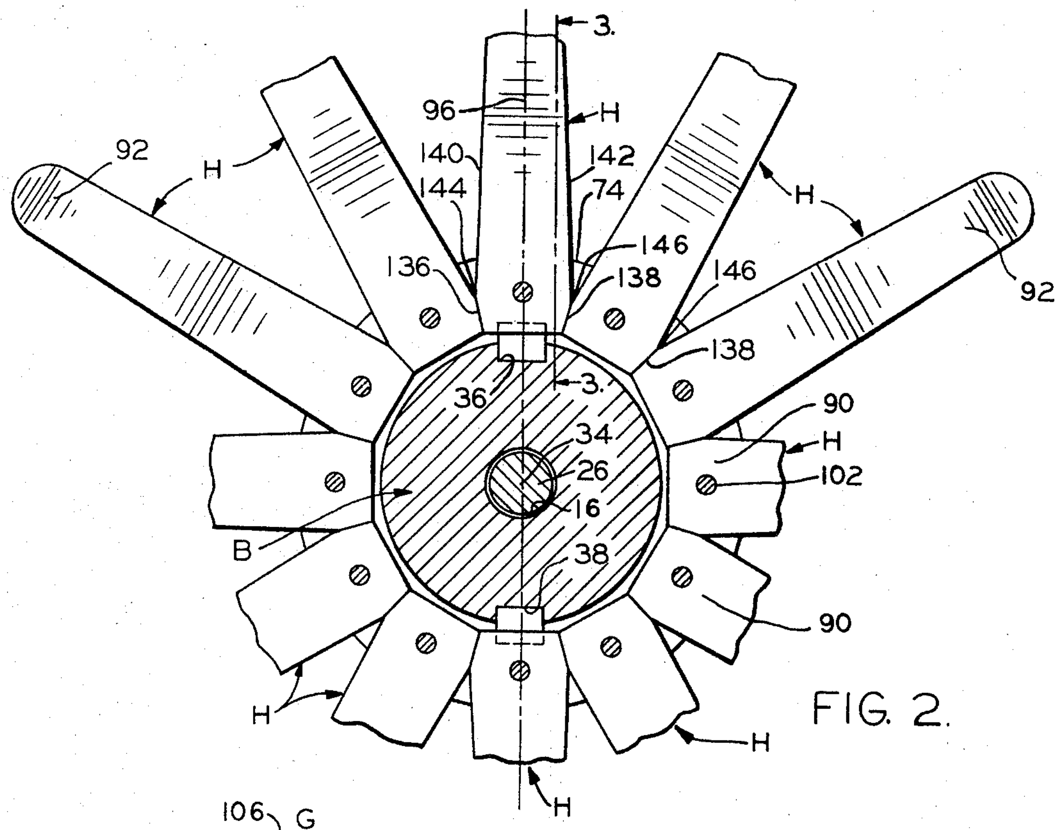
FIG. 2 is a cross-sectional elevational view looking generally in the direction of arrows 2—2 of FIG. 1.
FIG. 3 is a cross-sectional elevational view looking generally in the direction of arrows 3—3 of FIG. 2.
FIG. 4 is a view similar to FIG. 3 in showing a plurality of leaf springs; and, FIG. 5 is a view similar to FIGS. 3 and 4, and showing another arrangement of a plurality of leaf springs.

The flexing action of a spring H is generally shown in FIG. 3. Curved portion 112 generally rolls along inner surface 108 of outer plate members 76 during flexure thereof between the solid and dotted line positions shown. Distributing the bending force over a relatively large area greatly decreases the possibility of fatigue failure because recurring stress does not occur at a precise point or edge.

For arrangements where more spring force is desired, a plurality of stacked springs may be used as shown in FIG. 4. In the arrangement shown, there are three springs H positioned one above the other for providing greater spring force. Instead of having all of the plurality of stacked springs H of substantially the same length, it is possible to arrange a plurality of stacked springs of different lengths as shown in FIG. 5. FIG. 5 shows springs H with progressively shorter springs 130 and 132 stacked thereon for increasing the spring force, the curved relationship described with respect to the single spring for distributing the stress over a large bending area still exists.

In accordance with another aspect of the invention, mounting portions 90 have mounting portion opposite side edges 136 and 138 which extend radially from longitudinal axis 34 and intersect opposite side edges 140 and 142 of springs H at obtuse angles at intersecting points 144 and 146. Opposite side edges 140 and 142 converge from mounting end portion 90 toward free end portion 92. Arranging mounting portion opposite side edges 136 and 138 so that they extend radially from longitudinal axis 34 makes it possible to place a larger number of springs H between inner and outer plates 74 and 76 with adjacent side edges 136 and 138 on adjacent springs abutting one another, so that a larger number of leaf springs H may be gripped between inner and outer plates 74 and 76. In the preferred arrangement, intersecting portions 144 and 146 are located inwardly of outer edge 82 on inner plate member 74 so that curved flexure portion 112 has a maximum width in order to enhance the spring action and distribute the flexing stress over as wide a portion of the spring as possible.

Using the present invention, it will be appreciated that as the spring flexes, the length of its moment arm decreases because the last point where the spring engages the plates moves radially outwardly.

Using the invention fatigue failures of the leaf springs have been practically eliminated or the time period for them to occur substantially lengthened.

Although the invention has been shown and described with respect to a preferred embodiment, it is obvious that equivalent alterations and modifications will occur to others skilled in the art upon the reading and understanding of this specification. The invention includes all such equivalent alterations and modifications and is limited only by the scope of the claims.

Having thus described my invention, I claim:

1. In a variable pitch pulley having a pair of pulley halves relatively axially movable and resilient means for biasing said halves toward each other including a mounting member having an outermost edge and a surface facing axially toward one of said pully halves; and a plurality of radially extending leaf springs having an inner most mounting portion mounted against surface and an outer most portion bearing against one of said pulley halves and an intermediate flexing portion, the improvement which comprises: said axially facing surface extending radially outwardly beyond said outermost edge and said flexing portion diverging from said surface from a place radially inwardly of said outermost portion in a smooth tangent curve whereby the radially outermost place of engagement of said flexing portion with said surface moves radially outwardly as flexure occurs.

2. The improvement of claim 1 wherein said mounting portions have radially extending side edges and said edges of adjacent mounting portions generally abutt whereby said springs are held in radially extending relationship.

3. The improvement of claim 2 wherein each flexing portion has edges outwardly of said mounting portion which converge.

4. The improvement of claim 1 including a second mounting member abutting against the sides of said mounting portions remote from said first mounting member and having an outer peripheral edge radially inwardly of outermost edges of said mounting member.

5. The improvement of claim 1 wherein each leaf spring is comprised of a plurality of thin laminations.

6. The improvement of claim 5 wherein the laminations axially further away from said pulley half are radially shorter.

7. The improvement of claim 1 wherein said surface is flat and said spring is curved.

8. The improvement of claim 1 wherein said surface is curved.

* * * * *

UNITED STATES PATENT OFFICE
CERTIFICATE OF CORRECTION

Patent No. 3,869,932 Dated March 11, 1975

Inventor(s) Peter C. Fletcher

It is certified that error appears in the above-identified patent and that said Letters Patent are hereby corrected as shown below:

Column 5, line 30 through Column 6, line 1, delete "outer-most edge" and insert -- mounting portion --.

Signed and Sealed this

Thirteenth Day of July 1976

[SEAL]

*Attest:*

RUTH C. MASON
*Attesting Officer*

C. MARSHALL DANN
*Commissioner of Patents and Trademarks*